Dec. 29, 1970 A. N. WRIGHT ET AL 3,551,202

SYSTEM COMPONENTS HAVING PROTECTIVE FILM THEREON

Filed July 22, 1969

Inventors:
Archibald N. Wright,
Clarence J. Watters,
by Joseph T. Cohen
Their Attorney.

3,551,202

SYSTEM COMPONENTS HAVING PROTECTIVE FILM THEREON

Archibald N. Wright, Schenectady, and Clarence J. Watters, New Hartford, N.Y., assignors to General Electric Company, a corporation of New York Continuation-in-part of application Ser. No. 772,729, Nov. 1, 1968. This application July 22, 1969, Ser. No. 843,840
Int. Cl. G11b *5/40, 5/72, 5/84*
U.S. Cl. 117—239 3 Claims

ABSTRACT OF THE DISCLOSURE

A thin film of ultraviolet surface-photopolymerized tetrafluoroethylene, hexachlorobutadiene, butadiene, hexadiene or hexafluoropropylene is provided on a magnetic read-record head or a recording member of magnetic recording apparatus to protect the magnetic material film or coating during close clearance operation of these components.

This is a continuation-in-part of application Ser. No. 772,729, now abandoned, filed Nov. 1, 1968 and assigned to the assignee hereof.

This invention generally relates to magnetic systems such as magnetic reading and recording apparatus (hereinafter referred to as "RRA"), and to electromagnetic machinery. More particularly, this invention concerns rotating machinery components such as those of motors and generators and also specifically concerns magnetic RRA wherein a backing material, which may be in the form of a tape, belt, disc, drum, or the like, or the recording head, is provided with a protective film on the surface of said recording head, or over the tape, belt, disc or the like which is adjacent to the other members. Usually such backing material may be a material such as a resinous surface, paper, glass, or metal or the like.

This invention is particularly applicable to video tape recording, magnetic computer recording and readouts, and the like. It will be apparent from the description which follows, however, that the invention is applicable to any magnetic recording and readout system as well as to a wide variety of electromagnetic devices.

In the fields of memory systems and rotating machinery design work, precision and close tolerances in physical dimensions, magnetic paths and electrical circuit parameters are essential. There is often required in these precision electromagnetic systems, magnetic components with light but uniform contact pressure or extremely close clearance in air gaps between the moving parts of magnetic circuits. In the case of magnetic memory systems, the recording means consist of very thin films of magnetic materials which are coated on substrates in the form of tapes, discs or metal drums. These magnetic materials run at high speed in close space relationship, or under light pressure contact with the magnetic read/record heads. Both the magnetic recording means and the read/record heads require protective coatings offering low friction and wear qualities as well as protection against atmospheric and moisture attack.

It is also known in video tape recording and reproducing that the head ordinarily moves from side to side on the tape either at a slight angle normal to the tape travel, or that the movement of the head can be almost parallel to the sides of the tape in a spiral or helical scan, wherein each pass of the head represents an entire frame of the picture. In the latter system, which is quite commonly used in close circuit television systems, particularly for educational purposes, frequently it is necessary to employ a still frame operation wherein the tape is stopped and the head continues to move so that a single portion of the tape is continually in contact with the moving head. It is obvious that when the RRA is in the still frame motion position, a small portion of the tape is subjected to the equivalent of a thousand normal playbacks of the tape. It is therefore desirable to have a protective film on such magnetic recording tapes which would minimize undesirable wear.

The protection of such video tapes and tapes used in magnetic RRA has been heretofore obtained by incorporation of lubricants in the resin system which binds the magnetic particles to the substrate. These lubricant systems have not been fully satisfactory since the lubricant can leach out of the magnetic tape and cause an oily film which can clog up the mechanism and the recording heads with particles of the lubricant.

It is therefore an object of the present invention to provide a protective and lubricating film on a magnetic RRA whereby the useful life of such apparatus is prolonged.

Another object of the invention is to provide the surface of such magnetic RRA with a protective film whereby the damage from the "crashing" of a magnetic recording head on the magnetizable surface will not injure the magnetic head or magnetic recording member.

It is still another object of this invention to provide a lubricated and protective surface for a magnetic tape or other recording device, wherein the lubricating means does not reduce the shelf life of the tape or other recording medium.

A further object of this invention is to prolong the average service life of rotating electromagnetic machinery components without impairing their operating performance, by protecting their magnetic thin films or coatings from impact damage, abrasion or wear and corrosion.

The foregoing and other objects, features and advantages of the present invention will be apparent from the following and more particular description of preferred embodiments of the invention as illustrated in the accompanying drawings, in which.

Figure 1:
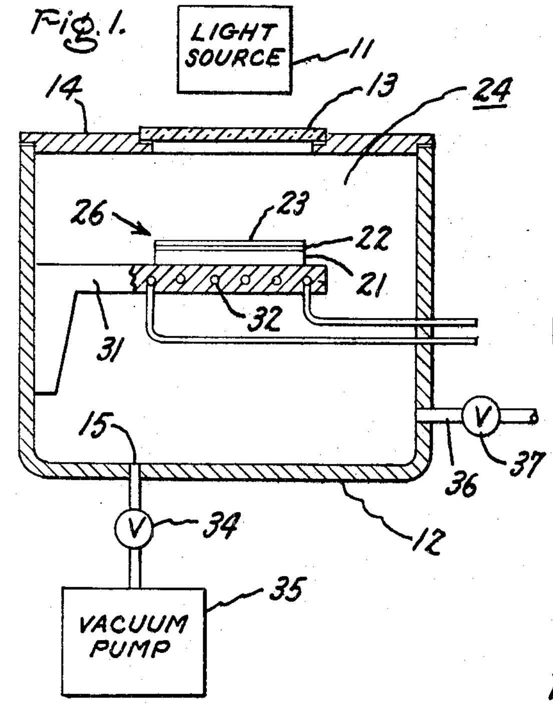
FIG. 1 is an elevational view, partly in section, of apparatus for providing lubricating and protective coatings in the production of articles of this invention.

Referring now to the drawings, there is shown in FIG. 1, an apparatus useful in the practice of this invention, it being understood that various modifications to the illustrative apparatus may be made as required. As shown, a vacuum chamber is provided by housing 12, which may be fabricated of either glass or metal, to which is secured upper base plate member 14. An opening 15 is provided in the lower portion of the vacuum chamber through which is connected a conventional vacuum pump 35 which is used to both evacuate the vacuum chamber as well as to maintain a predetermined pressure therein. Pump 35 may include any of the various combinations of pumps presently employed in vacuum technology such as, by way of example, the combination of rotary mechanical pumps and a high vacuum oil diffusion pump. Pump 35 is interconnected to the vacuum chamber through valve 34. In base plate 14, there is positioned a quartz window 13 underneath light source 11 through which the upper surface of magnetic article 26 can be irradiated with ultraviolet light in the presence of monomer vapor 24 to produce the polymerized film thereon. Article 26 is positioned on holder 31 which contains cooling coils 32. Composite article 26 comprises a thin polymer film 23 which is firmly adhered to thin magnetic film 22 which in turn is adhered to substrate 21, substrate 21 being glass, metal, plastic or other material. Article 26 is positioned on holder 31 directly in line with light source 11 shining through quartz window 13.

Extending through the side wall of housing 12 is an inlet conduit 36 connected through valve 37 to a source of monomer gas (not shown) which can be bled into the vacuum chamber to enable the polymerization reaction to occur under the influence of ultraviolet light.

Figure 2:
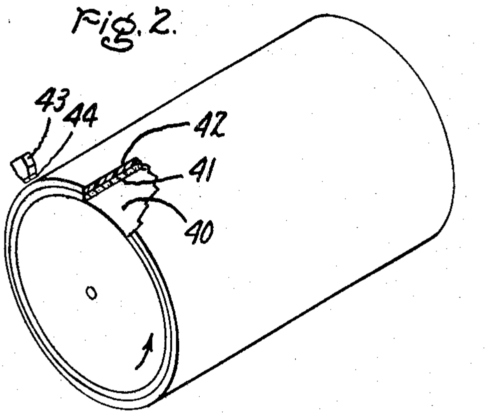
FIG. 2 is a perspective view of a magnetic memory drum embodying this invention.

FIG. 2 represents an electromagnetic recording medium produced in accordance with this invention and comprises magnetic memory drum 40 which has magnetic material coating 41 and lubricating or protective coating 42 from tetrafluoroethylene, hexachlorobutadiene or other polymer coated thereon and magnetic reading head 43 which has a polymer coating 44 on the wearing surface thereof from tetrafluoroethylene, from hexachlorobutadiene, etc.

Figure 3:
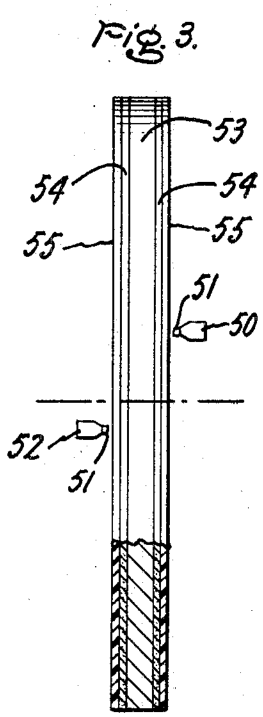
FIG. 3 illustrates a disc memory magnetic device embodying this invention.

FIG. 3 is a cross section of a magnetic disc memory device produced in accordance with this invention and includes two separate readout or recording heads 50 and 52 which have coated on the wearing surface thereof the lubricating or protective coating 51 produced in accordance with this invention and also includes the disc 53 having a magnetic thin film 54 about 2000 angstroms thick on each surface of said disc and protective coating 55 likewise about 2000 angstroms thick on each surface of the disc.

Figure 4:
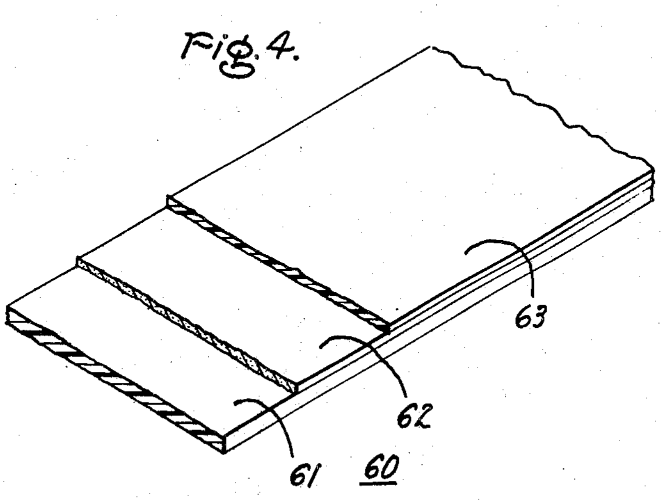
FIG. 4 is a fragmentary, perspective view of a magnetic tape which contains a thin polymer film protective and/or lubricating layer, which tape has been produced by this invention.

FIG. 4 illustrates a cross section of a magnetic tape produced in accordance with the process of this invention and comprises the plastic tape base substrate 61 of a material such as polyethyleneterephthalate, polyvinylchloride, etc., having thereon a thin, film 62 of magnetic material about 5000 angstroms thick and having lubricant and protective coating 63 about 5000 angstroms thick coated on the thin magnetic film in accordance with this invention.

In general, the objects of the present invention are achieved by depositing on the magnetic readout head and/or the magnetic recording medium a protective film having a thickness of less than 20,000 angstroms and preferably less than 2000 angstroms, which film reduces the abrasive effects of the movement under the magnetic recording or readout head, or has lubricating and protective qualities whereby the wear on the magnetic recording film and on the magnetic read-record head is reduced.

In accordance with the process of this invention, the head or recording medium is placed in a high vacuum system capable of maintaining the pressure in a system at 5 torr or less. This vacuum system contains a cooling block for the head or magnetic recording article, a source of ultraviolet radiation and a souce of a monomer gas selected from the class consisting of tetrafluoroethylene, hexafluoropropylene, butadiene, hexadiene, hexachlorobutadiene or mixtures thereof. The source of ultraviolet radiation may be internal or external. If external, it will be necessary to have a non-ultraviolet light-absorbing cover for the vacuum system. Such non-ultraviolet absorbing medium are, for example, quartz glass and other systems known to those skilled in the art.

In accordance with this invention, a substrate is coated with a dispersion of magnetic particles in a resin binder by procedures known to those skilled in the art such as calendaring solution coating, doctor blade coating, etc., and the substrate and coating are then dried in the normal manner to firmly affix the magnetic coating to the substrate to produce a magnetic recording article. The magnetic recording article is then placed in a suitable vacuum chamber, such as that shown in FIG. 1, and a film having a thickness of preferably less than 20,000 angstroms deposited thereon, such film being deposited by ultraviolet surface polymerization of a gaseous monomer vapor such as tetrafluoroethylene, hexafluoropropylene, butadiene, hexadiene, hexachlorobutadiene, etc., or mixtures thereof.

Alternatively, the magnetic material may be provided in the form of a thin film deposited on the substrate surface suitably by electroless deposition, or by sputtering, or by electrolytic technique, all of which are known and used in the art. Suitably, such thin films will be of the order of 2000 angstroms in thickness and they will be ferromagnetic. Because these films are so thin, they require the unique protection in use afforded in accordance with this invention.

The method of depositing the film on the magnetic RRA of this invention is the method described in U.S. patent applications Ser. Nos. 530,971, filed May 12, 1964, and 618,132, filed Aug. 1, 1967, both in the name of A. Nelson Wright, which applications are assigned to the same assignee as the present invention and which applications are incorporated herein by reference thereto.

Various binders can be employed to produce the magnetic compositions which are coated on the magnetic recording devices produced in accordance with the present invention. Such binders are, for example, polyurethane resins such as those sold under the trade Estane which are produced by reacting a polyhydroxyl terminated polyester produced by reaction of adipic acid and butanediol-1,4 and p-p′-diphenylmethane diisocyanate to produce a substantially unreactive polymer. The resins which can be employed are the copolymers such as vinylidene chloride and acrylonitrile copolymers, epoxy resins, particularly those of the family consisting of high molecular weight epoxy resins, phenolic resins, vinyl chloride-vinyl acetate copolymers, cellulose acetate, vinyl acetate, methyl cellulose and acrylonitrile rubbers such as acrylontrile-butadiene copoymers and acrylonitrile-butadiene-styrene terpolymers, and mixtures of these various resins.

The magnetizable particles that can be embedded in the plastic binder in the magnetic recording member of the invention can be any ferro- or ferrimagnetic particles such as, for example, $\alpha$-$Fe_2O_3$, $Fe_3O_4$, Fe, Fe-Co, $CrO_2$, Ni-Co, and the like.

Thin magnetic films are suitably any of those of the prior art, a soft magnetic nickel-iron alloy (80 percent nickel and 20 percent iron) being a typical example of the high permeability films commonly employed for transducers. For low permeability, high coercive force characteristics desired in recording media, thin films of cobalt-nickel or pure cobalt, plus a few percent phosphorus in each case, are specially suitable. Manganese bismuth intermetallic compound and cobalt-chromium layer structures are also candidates for such use.

The present invention may be employed with magnetic thin films and coatings which are applied to a wide variety of backing materials such as paper, glass or metal, but it is particularly advantageous when the coatings are applied to a plastic backing material such as cellulose acetate, Mylar polyethylene terephthalate, polypropylene, polyethylene and the like. It is also feasible to apply a magnetic thin film directly to these backing materials and alternatively the magnetic material may be deposited on the surface of a primary layer of SiO suitably of 5000 angstroms thickness on the backing material.

In many instances, magnetic recording media employed in this invention will contain other compounds in their composition, as is well known to those skilled in the art. Thus, dispersants such as sodium sulfosuccinate, antistatic compounds such as carbon black may be added. fungicides such as phenyl mercuric oleate, antioxidants such as hydroquinone and the like may be in such compositions.

The following examples serve to further illustrate the invention:

EXAMPLE 1

In this example, two different flying heads from a flying head recording-readout magnetic apparatus were coated with a polymeric film having a thickness of approximately 1500 angstroms, said film being deposited in the apparatus shown in FIG. 1 by the ultraviolet surface photopolymerization of tetrafluoroethylene.

The two coated heads were then tested in a magnetic readout apparatus by "crashing" the heads on a magnetic disc at an angle which produced audible clicks and which had been shown to be damaging with an uncoated head. In both instances, the heads were run on the discs for times greater than 50 minutes; at the end of this time the discs were inspected for damage after the "crashings" and it was found that the discs were undamaged. When the same test was repeated with a flying head that had not been coated with the polymer from tetrafluoroethylene by the ultraviolet surface photopolymerization, it was found that the discs showed visual and operational failures after 20 minutes and it was no longer useful as a magnetic recording apparatus.

EXAMPLE 2

A series of six magnetic contact recording-readout heads were coated with a polymer film in the apparatus similar to that shown in FIG. 1. Two discs were placed in the apparatus with a means for rotating the discs under the quartz window and subjected to ultraviolet irradiation in an atmosphere of tetrafluoroethylene at a pressure of 2 torr to give polymer films of uniform thickness of approximately 1500 angstroms.

Two additional heads were coated by ultraviolet irradiation substituting hexafluoropropylene for the tetrafluoroethylene to give heads coated with a polymer from hexafluoropropylene.

The coated heads and discs were tested in a contact recording system under life test conditions of read, write, etc., and were found to have greatly extended service life. The tests were run continuously for 926 hours, at which time they were discontinued without evidence of failure. When five uncoated heads and uncoated discs were tested under the same conditions, four of the five failed after less than four hours running time.

EXAMPLE 3

A series of six-inch sections of magnetic tape, comprising Ni-Co magnetizable particles embedded in a matrix of polyvinyl chloride or a polyimide coated on a substrate of polyethyleneterephthalate, were coated with polymer film having a thickness of about 1500 angstroms by the ultraviolet surface photopolymerization technique shown in Example 1. The polymerizable monomers employed were tetrafluoroethylene, hexachlorobutadiene, butadiene and 2,4-hexadiene.

The six-inch coated sections were spliced into a tape and tested at 800 bits per inch in a tape transport. The machine was run continuously and three tracks monitored for dropouts (zero ability to record or read out). The system was run to destruction defined as two permanent dropouts in any one pass or a total of five permanent dropouts.

Untreated tapes showed approximately 20,000 passes before failure of the entire tape. In contrast to this, a tape coated with the polymeric film from tetrafluoroethylene showed failure on only one channel after 23,573 passes, while the other channels were still operative. A tape coated with a polymeric film from hexachlorobutadiene showed similar results as those obtained with the polymeric film from tetrafluoroethylene. A tape coated with a film from butadiene showed failure on only one inside channel after 51,573 passes.

It will be apparent from the above description and from the appended claims that the present invention provides antifriction and corrosion resistant coatings of low friction, and chemically inert and moisture resistant polymers obtained from the ultraviolet photopolymerization in the gas phase of the various described monomers, wherein the coatings are in the form of very thin, essentially imperforate films which permit more efficient designs in drum, disc and tape memory systems. It should also be recognized that similar benefits in magnet circuitry efficiency can be derived from the use of this invention in precision electromagnetic rotating equipment designs, such as motors, generators, stators, alternators, magnetos, selsyns, gyros, etc., where similar problems are encountered with close air gaps required in precision design of rotor and stator parts. The application of the ultraviolet deposited polymer films will permit the running and maintenance of closer air gaps without detrimental scoring and corrosion.

What we claim as new and desire to secure by Letters Patent of the United States is:

1. An article of manufacture comprising an electromagnetic system component having a thin film of magnetic material and a protective ultraviolet surface photopolymerized film overlying and integrally bonded to the magnetic material film, said protective film being essentially impervious and of substantially uniform thickness less than 2,000 angstroms and being a polymer from a monomer selected from the class consisting of tetrafluoroethylene, hexafluoropropylene, hexachlorobutadiene, butadiene, hexadiene, or mixtures thereof.

2. The article as in claim 1 wherein the protective film is a polymer from butadiene monomer.

3. An article of manufacture as in claim 1 wherein the protective film is a polymer from tetrafluoroethylene monomer.

References Cited

UNITED STATES PATENTS

| | | | |
|---|---|---|---|
| 3,197,210 | 7/1965 | Atsumi | 179—100.2 |
| 3,243,790 | 3/1966 | Powers | 179—100.2 |
| 3,353,166 | 11/1967 | Brock | 179—100.2 |

FOREIGN PATENTS

| | | | |
|---|---|---|---|
| 830,364 | 3/1960 | Great Britain | 179—100.2 |

OTHER REFERENCES

Whitney, M. L., "Protective Coating for Magnetic Surfaces," IBM Tech. Disclosure Bul., vol. 1, No. 1, p. 3, June 1964.

Friedman, H., et al., "Lubricants for Magentic Recording Media," IBM Tech. Disc. Bul., vol. 9, No. 7, p. 779, December 1966.

Militante, Jr., F., "Lubrication of Alloy Particle Tape," IBM Tech. Disc. Bul., vol. 9, No. 10, p. 1307, March 1967.

BERNARD KONICK, Primary Examiner

W. F. WHITE, Assistant Examiner

U.S. Cl. X.R.

117—240; 179—100.2; 340—174.1